No. 643,981. Patented Feb. 20, 1900.
B. F. ROBINSON.
APPARATUS FOR USE IN WRITING BY HAND.
(Application filed Aug. 1, 1899.)
(No Model.) 3 Sheets—Sheet 1.
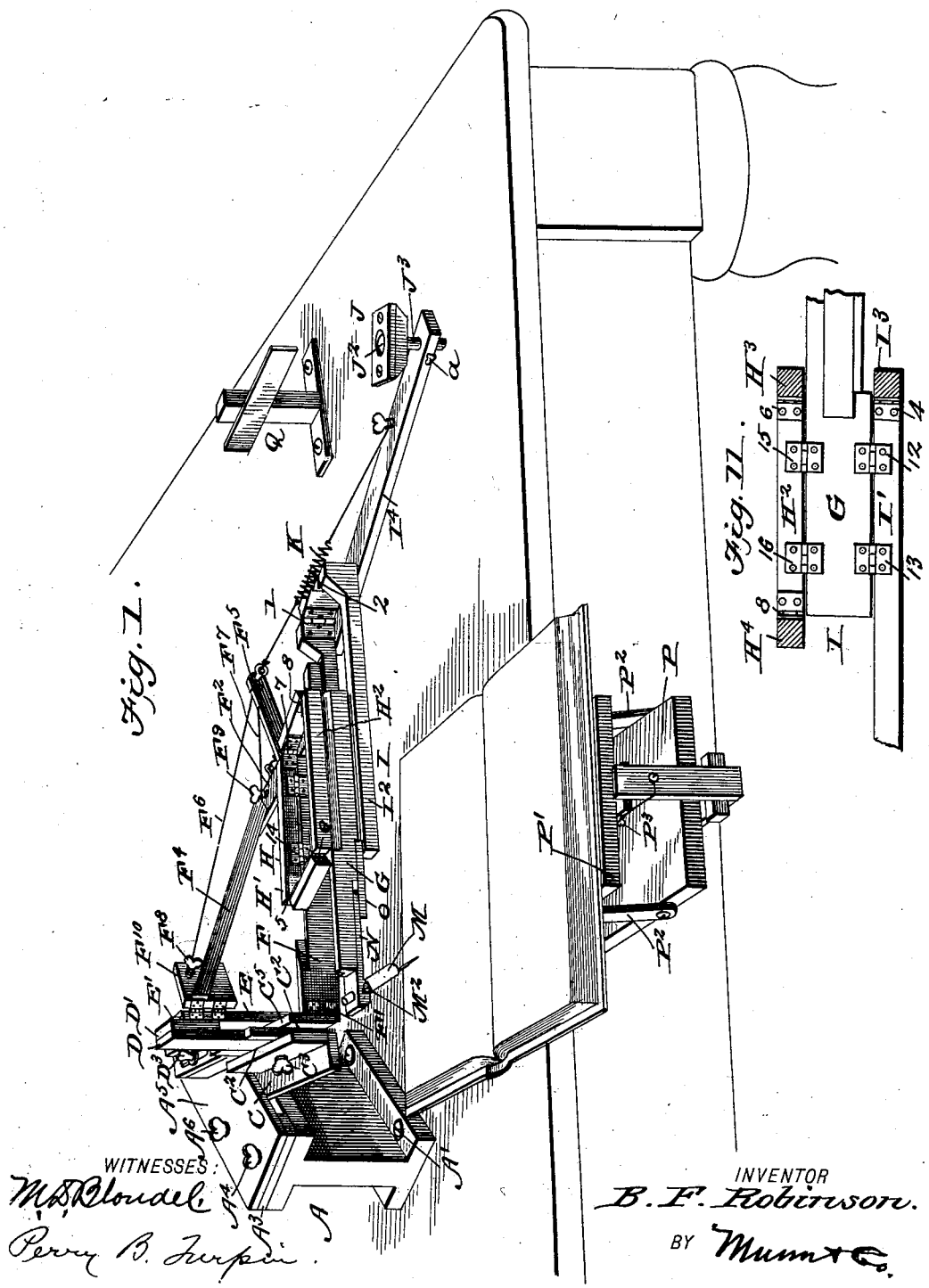
WITNESSES:
INVENTOR
B. F. Robinson.
BY
ATTORNEYS.

No. 643,981. Patented Feb. 20, 1900.
B. F. ROBINSON.
APPARATUS FOR USE IN WRITING BY HAND.
(Application filed Aug. 1, 1899.)
(No Model.) 3 Sheets—Sheet 2.
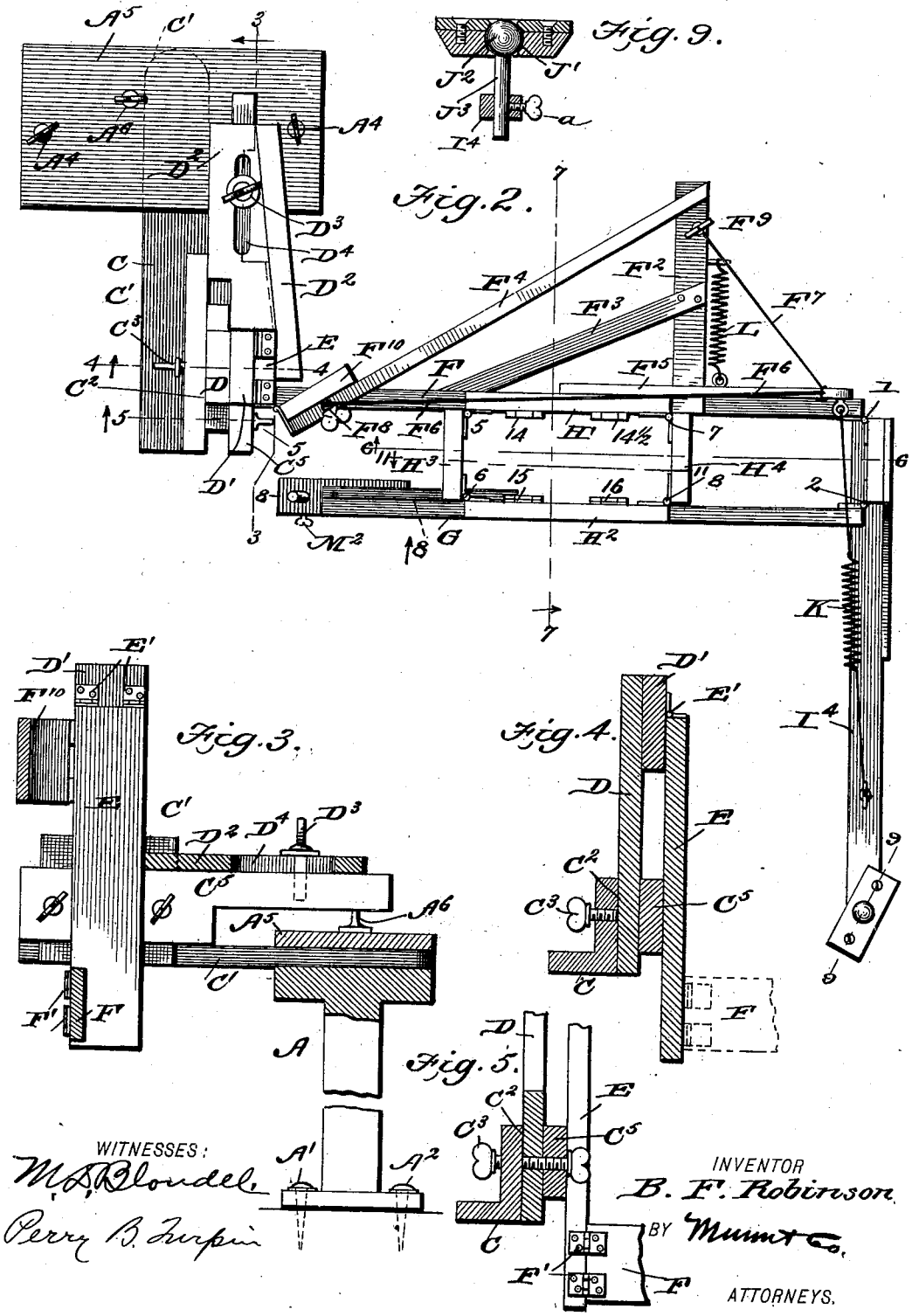
WITNESSES:
INVENTOR
B. F. Robinson
BY
ATTORNEYS.

No. 643,981. Patented Feb. 20, 1900.
B. F. ROBINSON.
APPARATUS FOR USE IN WRITING BY HAND.
(Application filed Aug. 1, 1899.)

(No Model.) 3 Sheets—Sheet 3.

WITNESSES:
M. D. Blondel
Perry B. Turpin

INVENTOR
B. F. Robinson,
BY Munn & Co.
ATTORNEYS.

UNITED STATES PATENT OFFICE.

BENJAMIN F. ROBINSON, OF NEAR MARGARET, WEST VIRGINIA.

APPARATUS FOR USE IN WRITING BY HAND.

SPECIFICATION forming part of Letters Patent No. 643,981, dated February 20, 1900.

Application filed August 1, 1899. Serial No. 725,730. (No model.)

*To all whom it may concern:*

Be it known that I, BENJAMIN F. ROBINSON, residing near Margaret, in the county of Harrison and State of West Virginia, have invented a new and useful Improvement in Apparatus for Use in Writing by Hand, of which the following is a specification.

My invention is an improved apparatus for use in writing by hand, and has for an object to provide novel means by which motions of large scope may be reduced so the muscles may have a large movement or sweep in forming the letters or characters, and such letters or characters will be inscribed on a reduced scale; and the invention consists in certain novel constructions and combinations of parts, as will be hereinafter described, and pointed out in the claims.

Figure 6:
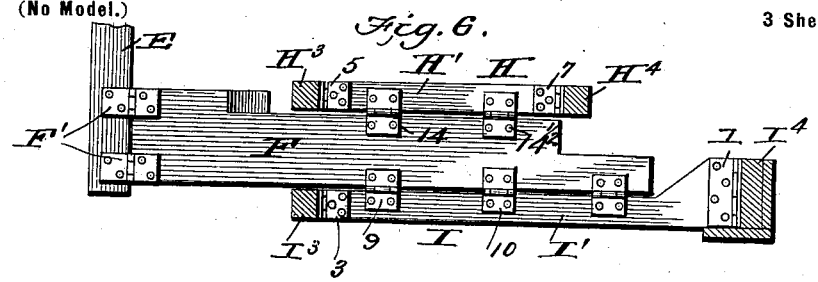
Figure 7:
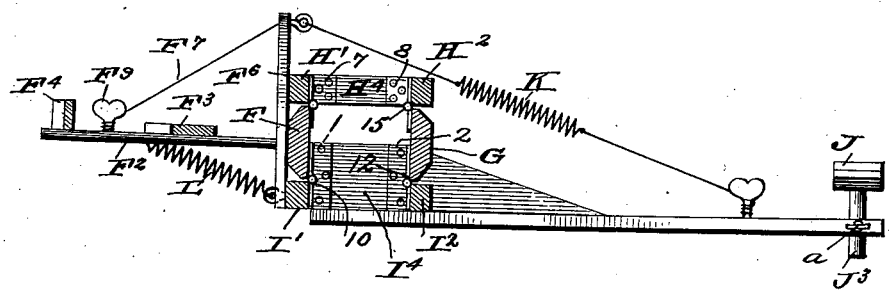
Figure 8:
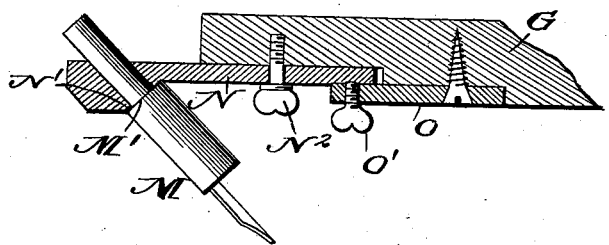
Figure 10:
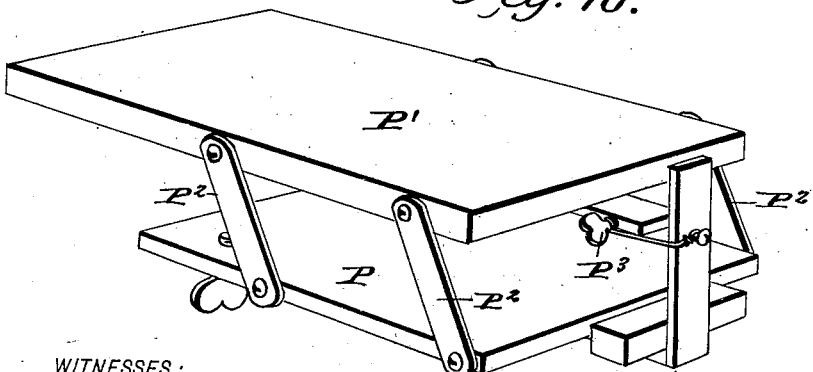

In the drawings, Figure 1 is a perspective view of my improved apparatus in position for use. Fig. 2 is a top plan view of same. Fig. 3 is a vertical section on about line 3 3 of Fig. 2. Fig. 4 is a vertical section on about line 4 4 of Fig. 2. Fig. 5 is a vertical section on about line 5 5 of Fig. 2. Fig. 6 is a vertical section on about line 6 6 of Fig. 2. Fig. 7 is a vertical section on about line 7 7 of Fig. 2. Fig. 8 is a vertical section on about line 8 8 of Fig. 2. Fig. 9 is a detail section on about line 9 9 of Fig. 2. Fig. 10 is a detail perspective view of the support for the book or other writing-surface, and Fig. 11 is a sectional view on about line 11 of Fig. 2.

Believing that motions of large scope are more conducive to muscular development and endurance and to the general health than those more delicate motions, it is deemed advisable that ordinary practical writing by hand should be done by recording those larger motions made by the muscles on a reduced scale, and for this purpose I have devised the mechanism shown in the drawings, and which I will now describe.

A block or pedestal A supports the moving parts of the writing apparatus. This pedestal A is in practice of considerable height—say eight or ten inches or more—and is suitably secured to the desk—it may be by screws A' and A², as shown.

A clamp is provided at the upper end of the pedestal for the shank C⁶ of the swinging arm C. This clamp is preferably formed by providing on the upper side of the pedestal cleats A³, spaced apart and receiving the set-screws A⁴, which secure the clamping-plate A⁵, which overlies the shank C of the arm-support. The screws A⁴ may be operated to clamp the shank C⁶ in any desired position, and where desired extra clamping-screws A⁶ may be applied to the plate A⁵. The shank C⁶ may be adjusted in the clamp longitudinally and laterally or swung longitudinally to any desired position and be rigidly clamped in such position by the means before described.

The arm-support C' is provided with the shank C⁶, which is fitted and held in the clamp, as before described, and is provided with a vertical socket C², having the screw-secured clamping-plate C⁵, and provided with a clamping-screw C³, by which to secure the post D, to which is hinged the upright bar E, carrying the swinging devices presently described.

The screw C³ is simply a clamping-screw threaded in the wall of the socket C² and pressing at its point against the post D, so as to secure the said post in any desired vertical adjustment.

The bar E is hinged at E' at its upper end to the post D or to an offset D', secured alongside said post, so the bar E will lie outside the socket C². The hinge E' has a horizontal pintle or axis, so the upright bar E can swing in a vertical plane when it is desired to raise the apparatus, as in turning leaves of books or for other purposes, without altering the vertical adjustment of the machine, and it is clamped to the wall of the socket C², where desired, by means of the locking-bar D², slidably connected with the support by means of a screw D³, passed through a slot D⁴, so the bar D² can be adjusted to clamp by a wedging action the upright bar E or to release the same for turning a leaf, as may be desired.

The swinging devices include a main bar F, hinged at F' to the upright bar E by hinges having vertical pintles, so the bar F can swing laterally. A bar F² extends laterally from the outer end of the main bar and is braced between its ends by a brace-bar F³, which connects it with the bar F, and at its outer end by the strut-brace F⁴, which extends diagonally upward from the outer end of the bar $F^2$, to which it is fixed, and is hinged at its upper end to the bar E by means of the block $F^{10}$, which may be integral with or suitably secured to the bar $F^4$, as desired. The main bar F is further braced by an arm $F^5$, extending diagonally upward from its outer end and connected with the block $F^{10}$ at the upper end of the strut-brace $F^4$ by a guy-line $F^6$ and with the outer end of the lateral bar $F^2$ with a guy-line $F^7$, such lines $F^6$ and $F^7$ connecting with windlass-screws $F^8$ and $F^9$, so they can be tightened when desired.

The tracing and guying devices, as shown, are employed in connection with the elastic cord K to the handle-bar, as presently described, to prevent the straining or wrenching of the main bar in its support, the handle-bar swinging freely in a horizontal plane and the elasticity of the connection K permitting the free end of the handle-bar to be lowered in shading.

The pen-supporting bar G is arranged opposite the main bar F and parallel thereto, being maintained in true parallel relation to the main bar by the upper frame H and the lower frame I. The upper frame H is composed of the side bars $H'$ and $H^2$, hinged at their lower edges at 14 and $14\frac{1}{2}$ and 15 and 16, respectively, to the main bar F and the pen-bar G, and the inner and outer end bars $H^3$ and $H^4$, hinged at 7 and 8 and at 5 and 6 at their ends to the bars $H'$ and $H^2$ and constituting therewith a parallelogram connecting the main bar with the pen-bar G. The lower frame I comprises the side bars $I'$ and $I^2$, hinged at their upper edges at 9 and 10 and at 12 and 13 to the lower edges of, respectively, the main bar F and the pen-bar G, and the inner and outer end bars $I^3$ and $I^4$ are hinged at 3 and 4 and at 1 and 2 to and extending between and connecting the side bars $I'$ and $I^2$.

By connecting the upper and lower parallelograms in the manner described to the main bar F and the pen-bar G it will be observed that there is formed another parallelogram, the position of which is at right angles to that of the other two parallelograms, and the bars F and G constitute two opposite sides of this parallelogram, so the bar G will always retain its position parallel to the bar F both vertically and laterally as the handle-arm is swung vertically and laterally in the operation of the device. In the upper parallelogram either of the end bars $H^3$ or $H^4$ may be omitted; but I prefer to use both of said bars, as shown.

The end bar $I^4$ is prolonged to form the handle-bar for the apparatus and support at its outer end the handhold J. Manifestly the part $I^4$ is practically a part of the handle-bar and may be integral therewith or suitably secured thereto. This handhold includes a block having upper and lower plates held together and provided in their inner meeting faces with a socket $J'$, which receives the ball $J^2$, which is held to the handle-arm, preferably by fitting the stem $J^3$, carrying said ball, in an opening in the arm $I^4$ and securing it by set-screw $a$. The block J forms the handhold by which the apparatus is manipulated in writing and, being neatly fitted on the ball, so that it may play freely yet closely around the ball, renders the handle capable of a nice adjustment to the hand in the various positions which the hand will assume in rapid manipulation of the machine while writing.

The handle-arm is braced by the spring connection K with the arm $F^5$, and the side bar $I'$ is connected by a spring connection L with the lateral bar $F^2$, such springs K and L tending to balance the apparatus and leave the handle-arm free for manipulation in the operation of the apparatus. The spring connection L also prevents the end of the pen from bounding too suddenly after pressure in shading.

The pen-bar G carries the pen or other suitable writing device, and it should be understood that in referring to the device as a "pen" and its bar as a "pen-bar" I do not wish to be confined to the conventional pen.

The penholder M is inserted in its bar N at a slant of about forty-five degrees, the holder having a shoulder $M'$ fitting up against the inclined face $N'$ of the bar N, stopping the holder in the desired vertical adjustment, a screw $M^2$ securing the holder in position. The pen is so placed in the holder that its point will be in line with the longer axis of the holder, so that in turning the holder in the block the nibs of the point may press evenly on the paper.

The bar N is pivoted at $N^2$ to the pen-bar G vertically above the point of the pen, and the clamp-block O, with its set-screw $O'$, serves to hold the bar N in place. The position of the bar N can thus be changed by turning on the pivot $N^2$, so that the shade of the writing may be made on any degree of slant desired.

It will now be noticed that as the main bar F in using the apparatus always retains its vertical position, and as the pen-bar G is always parallel to bar F, the sides of the latter will remain vertical when such bar G is raised or lowered, or, in other words, in raising or lowering the handle end of the machine, as in shading, the bar G will be raised or lowered proportionately, but will not be tilted, as the bar $I^2$ below it is tilted by the movement of the handle-bar by the handhold hereinbefore described.

For regulating the height of the material on which the writing is to be done I provide a folding frame composed of the base P, suitably secured to the desk or table, the top plate $P'$, the short swinging bars $P^2$, supporting the top plate, and operating-screw $P^3$ and cord for raising the top plate to any desired degree. The screw $P^3$ is journaled in a bar connected with the plate $P'$, and the cord winds at one end on said screw as a windlass, the other end of the cord being secured to a bar secured to the lower plate P. It is evident that if the cord be wound on the screw it will draw the top plate P' forward, so it will rise by reason of the swinging arms P², on which it is supported.

In using the apparatus it may be preferred to have the desk slanting at an angle of about forty or forty-five degrees; but in some work, such as writing on large books, it may be convenient to have the desk level.

In Fig. 1 I show the rest Q, on which the swinging devices may be supported when not in use. The handhold J should be set in such position that the center of the ball shall be in exact line with the following points: the point of coincidence of axes of hinges 1 and 9 10, the point of coincidence of axes of hinges 2 and 12 13, and secured by the set-screw $a$.

The handhold should be manipulated with large free rapid motions similar to the movement used in writing on a blackboard.

It will be noticed that in manipulating the handhold all parts thereof always remain at a fixed distance from the center of the ball no matter in what position the handhold is turned, so that a motion made by the hand always produces the same movement of the machine when the handhold is in one position as it does in another, and therefore the writing is recorded in true proportion to the motion made by the hand.

Having thus described my invention, what I claim as new, and desire to secure by Letters Patent, is—

1. The combination in an apparatus substantially as described of the main bar, the pen-holding bar, the upper and lower hinged frames connecting said bars, one of the bars of the lower frame being prolonged or extended forming the handle substantially as set forth.

2. In an apparatus substantially as described, the combination of the pen-bar, the main bar, a support to which the same is hinged, the extended handle portion, and the upper and lower parallelograms composed of bars hinged together and to the pen-bar and main bar, substantially as set forth.

3. In an apparatus substantially as described, the combination of the main bar, the handle and pen bars in connection with and supported from the main bar, the upright bar to which the main bar is hinged at one end to swing laterally, and a carrier to which said upright bar is hinged to swing vertically as set forth.

4. In a writing apparatus substantially as described the combination of means for supporting the pen, the handle connected with such means whereby to operate the same, the handhold movable freely in any and all planes, and the ball-and-socket joint between the handhold and the handle substantially as set forth.

5. In an apparatus substantially as described, the combination of the writing devices, the handle connected with and arranged to operate the same, the handhold movable freely in any and all planes having a ball and socket, and the ball fitting in said socket and having a stem connected with the handle substantially as set forth.

6. The combination of a holder or support having a vertical socket, a bar fitting at its lower end in said socket the upright bar hinged at its upper end to the said first bar and swinging vertically on said hinge, the main bar hinged to said second bar the pen-bar and handle and connections between the main bar and the pen-bar and handle substantially as set forth.

7. In an apparatus substantially as described, the combination of a holder or support having a socket for one of the upright bars of the swinging frame, the swinging frame having a bar fitted to said socket and an upright hinged to said bar and swinging vertically thereon, a laterally-sliding bar by which to engage the upright and means for securing said laterally-sliding clamp in engagement with the upright substantially as set forth.

8. The combination of the pedestal having a laterally-opening clamp, the writing devices, and the carrier therefor having a shank fitted and held in the laterally-opening clamp of the pedestal substantially as set forth.

9. In an apparatus substantially as described, the combination of the main bar, the pen-supporting bar arranged laterally to the main bar, and parallelograms connecting the main and pen bars and composed of sections hinged endwise together and edgewise to said bars substantially as set forth.

10. The combination of the main bar, the bar extending laterally from the main bar near its outer end, the upright to which the inner end of the main bar is hinged, and a strut-brace hinged at its inner end to said upright and connected at its outer end with the brace extending laterally from the main bar substantially as set forth.

11. In an apparatus substantially as described, the combination of the main bar having at its outer end the upwardly-directed arm or bar, the handle-bar, intermediate connections between the main bar and the handle-bar, and the contractile spring cord or connection between the handle-bar and the upwardly-directed arm of the main bar substantially as set forth.

12. In an apparatus substantially as described, the combination of the main bar having a laterally-extending arm, the pen-holding bar, the lower parallelogram comprised of sections hinged together and to the main bar and pen-bar, and one of the sections being extended to form the handle-bar, and the contractile-spring connection between said parallelogram and the lateral arm of the main bar substantially as set forth.

13. In an apparatus substantially as described, the combination of the main bar, the pen-bar, the parallelogram frame connecting the main and pen bars and hinged to both said bars, the small bar pivoted to the pen-bar and carrying the penholder and the clamp for securing the penholder-carrying bar in its different adjustments substantially as set forth.

14. The combination in an apparatus substantially as described of the pen-bar, the handle-bar, jointed connections between the handle and pen bars, the handhold movable freely in any and all planes and the ball-and-socket joint between the handhold and handle-bar substantially as set forth.

15. A writing apparatus having a pen-supporting device arranged for operation by the handle-bar, a handle-bar and a handhold movable freely in any and all planes having a universal joint connecting it with the handle-bar substantially as set forth.

BENJAMIN F. ROBINSON.

Witnesses:
C. A. SNODGRASS,
R. E. L. SNODGRASS.